United States Patent
Osada et al.

(10) Patent No.: US 8,680,733 B2
(45) Date of Patent: Mar. 25, 2014

(54) ELECTRIC ROTATING MACHINE

(75) Inventors: Masahiko Osada, Okazaki (JP);
Takuzou Mukai, Handa (JP); Aki Itakura, Nishio (JP)

(73) Assignee: Denso Corporation, Kariya (JP)

(*) Notice: Subject to any disclaimer, the term of this patent is extended or adjusted under 35 U.S.C. 154(b) by 266 days.

(21) Appl. No.: 13/353,484

(22) Filed: Jan. 19, 2012

(65) Prior Publication Data

US 2012/0181886 A1 Jul. 19, 2012

(30) Foreign Application Priority Data

Jan. 19, 2011 (JP) .................................. 2011-009079

(51) Int. Cl.
*H02K 1/00* (2006.01)

(52) U.S. Cl.
USPC ......................................... 310/179; 310/180

(58) Field of Classification Search
USPC .................................. 310/179, 180, 207, 260
See application file for complete search history.

(56) References Cited

U.S. PATENT DOCUMENTS

| | | | | |
|---|---|---|---|---|
| 6,809,437 B2* | 10/2004 | Oohashi et al. | ................ | 310/45 |
| 6,960,857 B2* | 11/2005 | Oohashi et al. | ............... | 310/179 |
| 8,466,598 B2* | 6/2013 | Osada et al. | ................... | 310/260 |
| 8,587,177 B2* | 11/2013 | Kitamura et al. | ............. | 310/195 |
| 2003/0146669 A1* | 8/2003 | Cha | ............................... | 310/179 |
| 2008/0315705 A1 | 12/2008 | Obata et al. | | |

FOREIGN PATENT DOCUMENTS

JP 2008-54404 3/2008

* cited by examiner

*Primary Examiner* — Nguyen N Hanh
(74) *Attorney, Agent, or Firm* — Nixon & Vanderhye PC (57) ABSTRACT

An electric rotating machine includes a multi-phase armature coil that is wound around a cylindrical armature core in a distributed winding manner. Each of phase windings of the armature coil is formed of an electric wire bundle which includes a plurality of insulation-coated electric wires that are electrically connected to one another. Each of the electric wire bundles forming the phase windings has a plurality of in-slot portions and a plurality of turn portions. Each of the in-slot portions is received in a corresponding slot of the armature core. Each of the turn portions protrudes from a corresponding axial end face of the armature core and extends to connect a corresponding adjacent pair of the in-slot portions of the electric wire bundle. For each of the electric wire bundles, the electric wires of the electric wire bundle are stranded at least at the turn portions of the electric wire bundle.

10 Claims, 8 Drawing Sheets

FIG.6A
(FIRST EMBODIMENT)

FIG.6B
(COMPARATIVE EXAMPLE)

FIG.8

ELECTRIC ROTATING MACHINE

CROSS-REFERENCE TO RELATED APPLICATION

This application is based on and claims priority from Japanese Patent Application No. 2011-9079, filed on Jan. 19, 2011, the content of which is hereby incorporated by reference in its entirety into this application.

BACKGROUND

1. Technical Field

The present invention relates to electric rotating machines that are used in, for example, motor vehicles as electric motors and electric generators. In addition, the invention can also be applied to industrial machines and household electrical appliances.

2. Description of Related Art

Conventionally, there are known electric rotating machines which include an armature core and a multi-phase armature coil wound around the armature core.

Moreover, there is disclosed, for example in Japanese Patent Application Publication No. 2008-54404, an electric rotating machine which includes an armature coil that is formed by winding thin electric wires around an armature core using a distributed winding method.

However, with the distributed winding method, the thin electric wires may be irregularly wound around the armature core, thereby lowering the space factors of the thin electric wires in slots of the armature core and increasing the axial length of coil ends of the armature coil. Here, the coil ends denote those parts of the armature coil which are located outside of the slots of the armature core and respectively protrude from opposite axial end faces of the armature core.

Moreover, the thin electric wires may easily become slack at the coil ends of the armature coil and in the slots of the armature core, thereby resulting in an uneven impedance distribution and thus an uneven electric current distribution in the armature coil.

SUMMARY

According to an exemplary embodiment, there is provided an electric rotating machine which includes a cylindrical armature core and a multi-phase armature coil. The armature core has a plurality of slots that are spaced from one another in the circumferential direction of the armature core and each open on a circumferential surface of the armature core. The armature coil includes a plurality of phase windings and is wound around the armature core in a distributed winding manner. Each of the phase windings of the armature coil is formed of an electric wire bundle which includes a plurality of insulation-coated electric wires that are electrically connected to one another. Each of the electric wire bundles forming the phase windings of the armature coil has a plurality of in-slot portions and a plurality of turn portions. Each of the in-slot portions is received in a corresponding one of the slots of the armature core. Each of the turn portions protrudes from a corresponding one of axial end faces of the armature core and extends to connect a corresponding adjacent pair of the in-slot portions of the electric wire bundle. For each of the electric wire bundles, the electric wires of the electric wire bundle are stranded at least at the turn portions of the electric wire bundle.

With the above configuration, since the electric wires are stranded at the turn portions of the electric wire bundles, tension will be applied to the electric wires. With the applied tension, it is possible to prevent each of the electric wires forming the electric wire bundles from becoming slack; it is also possible to prevent each of the electric wire bundles from becoming slack. Consequently, it is possible to minimize both the difference in length between the electric wires in the respective electric wire bundles and the difference in length between electric wire bundles (or between the phase windings of the armature coil). As a result, it is possible to achieve an even impedance distribution and thus an even electric current distribution in the armature coil.

Moreover, with the electric wires stranded at the turn portions of the electric wire bundles, it is possible to reliably prevent the electric wires of the same electric wire bundle from being separated from each other on the axial end faces of the armature core. As a result, it is possible to minimize the axial length of the coil ends of the armature coil.

In a further implementation, for each of the electric wire bundles, the electric wires of the electric wire bundle extend substantially parallel to each other at the in-slot portions of the electric wire bundle without being stranded together.

In another further implementation, in each of the slots of the armature core, part of the electric wires of a corresponding one of the electric wire bundles are stranded together while the remaining electric wires of the corresponding electric wire bundle extend substantially parallel to each other without being stranded together; the stranded electric wires are positioned closer to the circumferential surface of the armature core, on which the slots of the armature core open, than the unstranded electric wires are.

In yet another further implementation, each of the electric wire bundles is wave-wound around the armature core so that each circumferential-adjacent pair of the turn portions of the electric wire bundle are respectively positioned on opposite axial sides of the armature core and connected to each other via a corresponding one of the in-slot portions of the electric wire bundle. For each circumferential-adjacent pair of the turn portions of the electric wire bundle, the electric wires of the electric wire bundle are preferably stranded in a first direction at one of the pair of the turn portions and in a second direction at the other turn portion; the first direction is opposite to the second direction.

In still another further implementation, for each of the electric wire bundles, the electric wires of the electric wire bundle are divided into a plurality of groups and stranded on a group basis.

Further, for each circumferential-adjacent pair of the turn portions of the electric wire bundle, the electric wires of each of the groups are preferably stranded in a first direction at one of the pair of the turn portions and in a second direction at the other turn portion; the first direction is opposite to the second direction.

Furthermore, for each of the electric wire bundles, the electric wires of the electric wire bundle are divided into a first group and a second group. The first and second groups are radially arranged in two layers in each of the in-slot portions of the electric wire bundle; the two layers are a first layer and a second layer that is positioned closer to the circumferential surface of the armature core, on which the slots of the armature core open, than the first layer is. The first and second groups preferably cross each other at each of the turn portions of the electric wire bundle so that for each circumferentially-adjacent pair of the in-slot portions, the first and second groups are positioned respectively at the first and second layers in one of the pair of the in-slot portions and respectively at the second and first layers in the other in-slot portion.

In another further implementation, each of the electric wire bundles is preferably deflected at the turn portions thereof in a radial direction away from the circumferential surface of the armature core on which the slots of the armature core open.

In yet another further implementation, each of the electric wire bundles is wave-wound around the armature core by a plurality of turns. For each consecutive pair of the turns, the electric wire bundle is preferably wave-wound around the armature core clockwise in one of the pair of the turns and counterclockwise in the other turn.

In still another further implementation, the electric rotating machine preferably further includes a printed circuit board on which is mounted an inverter circuit for controlling energization of the armature coil. The printed circuit board preferably further has a plurality of copper patterns formed thereon. Each corresponding pair of ends of the electric wires of the electric wire bundles are preferably electrically connected to each other via a corresponding one of the copper patterns.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-8. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

Figure 1:
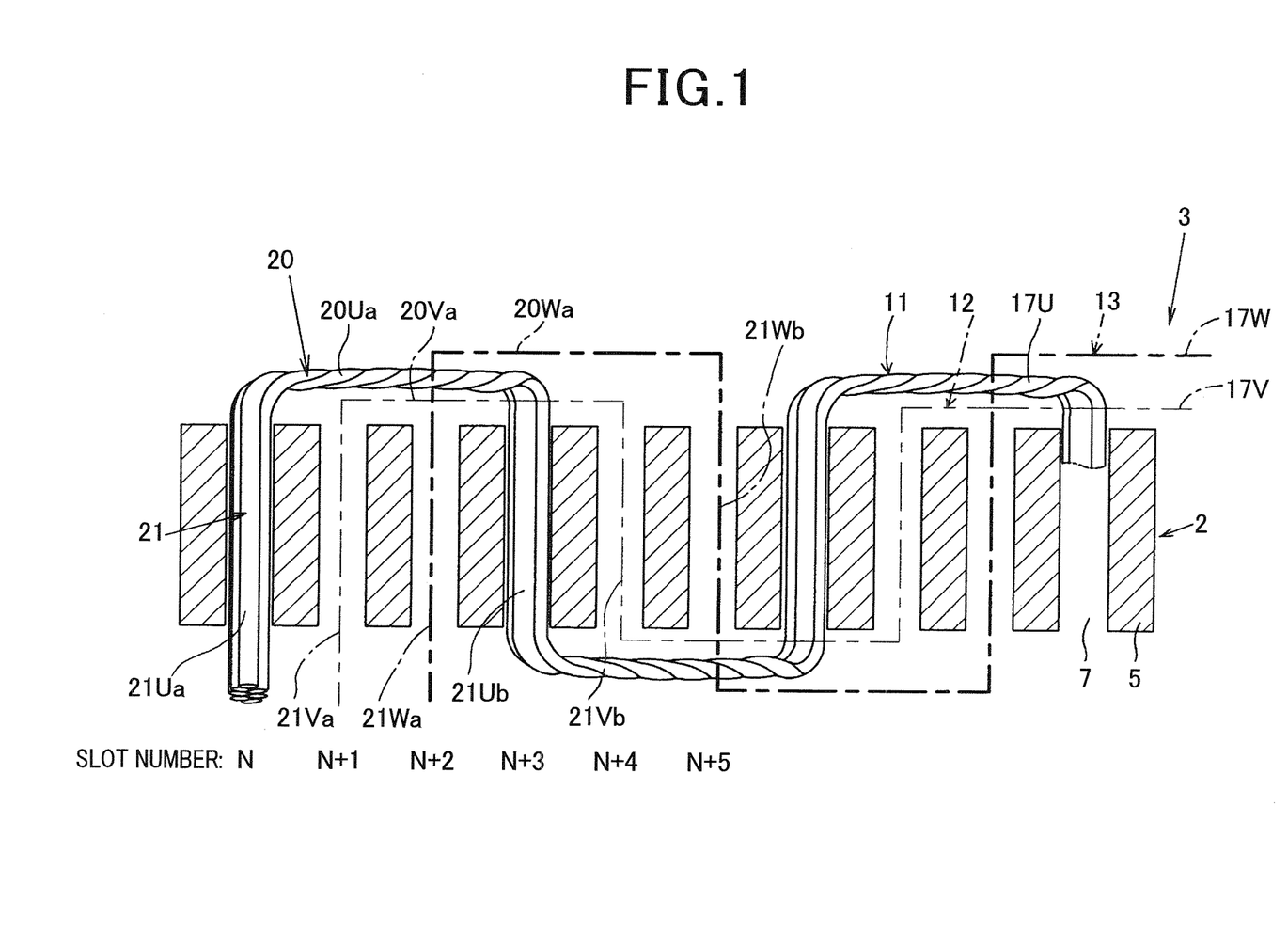
FIG. 1 is a development view of part of an armature of an electric rotating machine according to a first embodiment.

This embodiment illustrates an electric rotating machine 1 which is configured as a three-phase AC motor. As shown in FIG. 1, the three-phase AC motor 1 includes a stator (i.e., an armature) that is comprised of a stator core (i.e., an armature core) 2 and a stator coil (i.e., an armature coil) 3. The stator core 2 has a cylindrical shape. The stator coil 3 is wound around the stator core 2 in a distributed winding manner.

The three-phase AC motor 1 further includes a rotor (not shown) that is disposed radially outside of the stator core 2. In other words, the motor 1 according to the present embodiment is of an outer rotor type. In operation of the motor 1, the stator creates a rotating magnetic field upon supply of three-phase AC current to the stator coil 3. The rotating magnetic field causes the rotor to rotate in a predetermined direction. In addition, the rotor may be of a permanent magnet type, an electromagnet type or a reluctance type.

Figure 4:
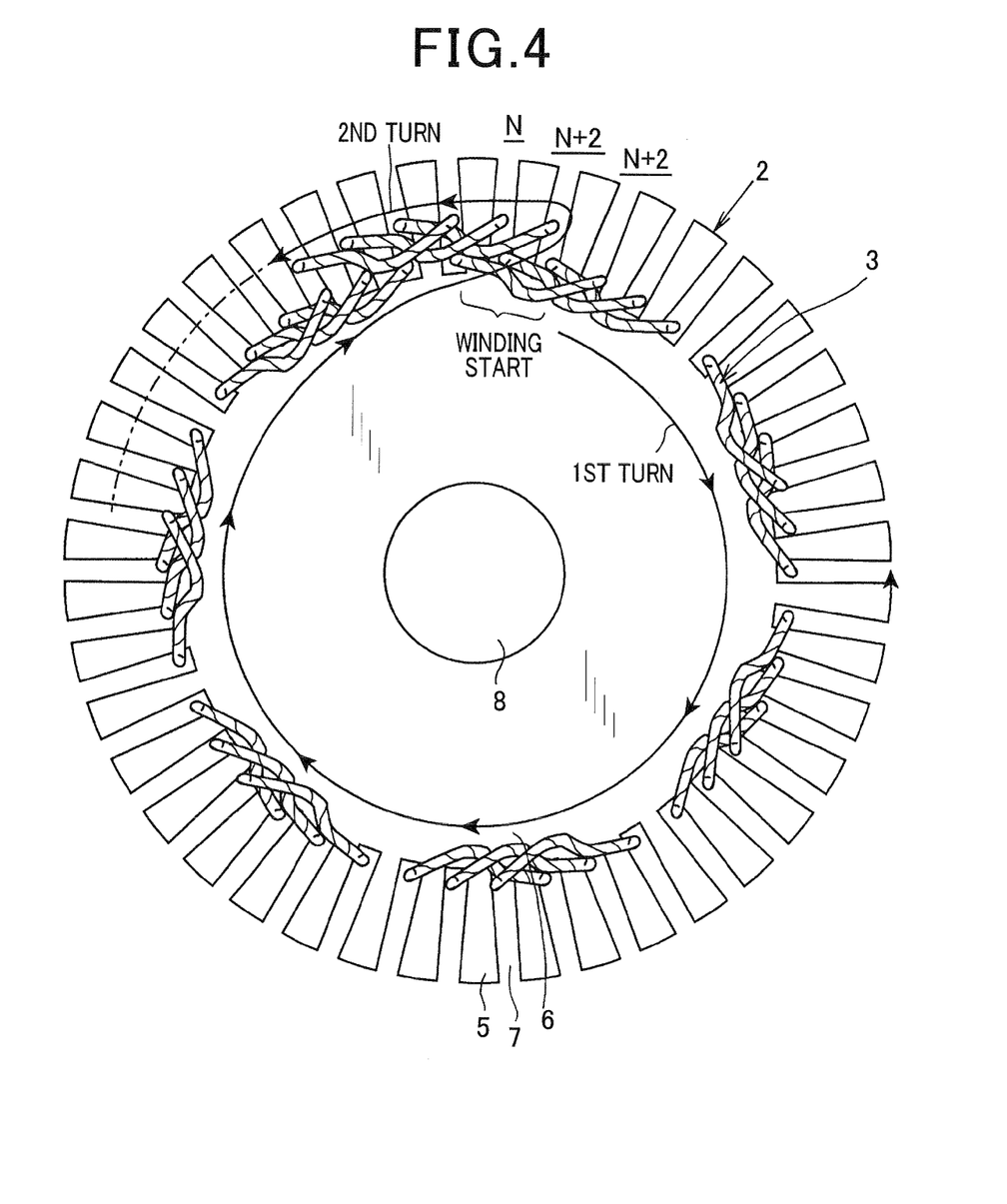
FIG. 4 is a schematic view illustrating the change in the winding direction of the electric wire bundle between different turns of the electric wire bundle.

In the present embodiment, the stator core 2 is formed by laminating a plurality of steel sheets in the axial direction of the stator core 2. As shown in FIG. 4, the stator core 2 has a plurality of stator teeth 5, a back yoke 6, and a plurality of slots 7. Each of the stator teeth 5 extends radially outward to have its distal end facing the rotor (not shown). The stator teeth 5 are spaced in the circumferential direction of the stator core 2 at predetermined intervals. The back yoke 6 is positioned radially inward of the stator teeth 5 to both magnetically and mechanically connect the stator teeth 5. Each of the slots 7 is defined by a corresponding circumferentially-adjacent pair of the stator teeth 5 and the back yoke 6. More specifically, each of the slots 7 is formed between the corresponding pair of the stator teeth 5 so as to open radially outward. That is, each of the slots 7 has an opening between the radially outer surfaces of the corresponding stator teeth 5 and a bottom at the outer periphery of the back yoke 6. In the present embodiment, the number of the slots 7 formed in the stator core 2 is equal to, for example, 42. In addition, at the radial center of the stator core 2, there is fixed a shaft 8.

The stator coil 3 includes a U-phase winding 11, a V-phase winding 12 and a W-phase winding 13. In the present embodiment, each of the phase windings 11-13 is formed of an electric wire bundle which includes a plurality of insulation-coated electric wires.

Figure 2A:
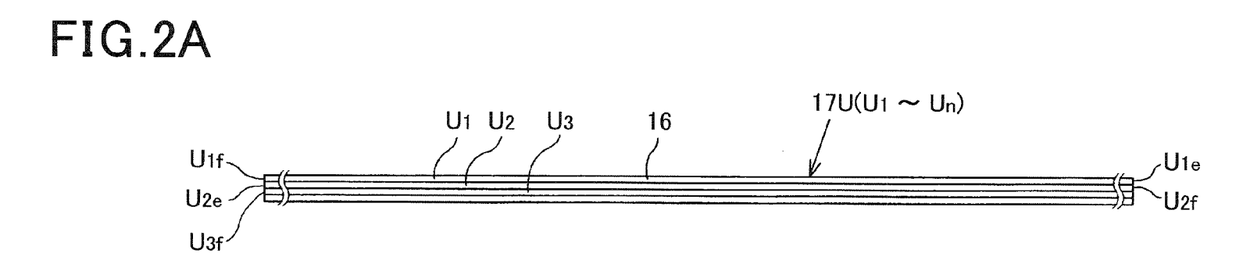
FIG. 2A is a plan view of an electric wire bundle, which makes up a U-phase winding of an armature coil of the armature, before being wound around an armature core of the armature.
Figure 2B:
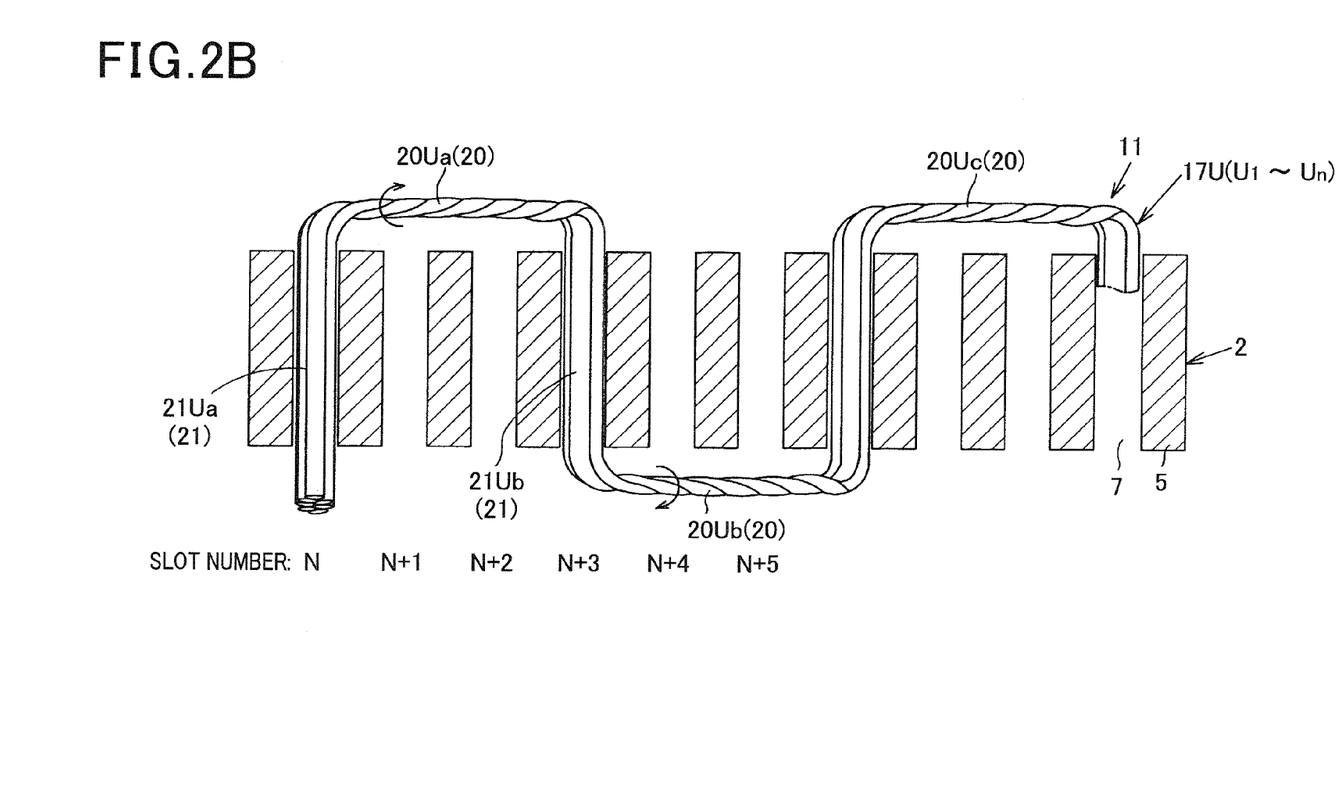
FIG. 2B is a development view illustrating the electric wire bundle wound around the armature core.

For example, referring to FIGS. 2A and 2B, the U-phase winding 11 is formed of an electric wire bundle 17U which includes n insulation-coated electric wires 16, where n is an integer not less than 2. Each of the electric wires 16 has an insulating coat formed at the surface thereof. Moreover, the electric wires 16 are so thin that the diameter of the electric wires 16 is less than, for example, 0.3 mm. In addition, for the sake of convenience of explanation, the n electric wires 16 of the electric wire bundle 17U will be respectively denoted by U1-Un hereinafter.

In the present embodiment, the electric wires U1-Un of the electric wire bundle 17U are electrically connected in series with one another, forming the U-phase winding 11 of the stator coil 3.

Specifically, a winding-finish side end U1$e$ of the electric wire U1 is electrically connected to a winding-start side end U2$f$ of the electric wire U2. A winding-finish side end U2$e$ of the electric wire U2 is electrically connected to a winding-start side end U3$f$ of the electric wire U3. In like manner, a winding-finish side end U(n−1)e of the electric wire U(n−1) is electrically connected to a winding-start side end Unf of the electric wire Un.

In addition, the V-phase winding 12 and the W-phase winding 13 are also formed in the same manner as the U-phase winding 11. The electric wire bundles, of which the V-phase winding 12 and the W-phase winding 13 are respectively formed, are respectively given reference numerals 17V and 17W hereinafter.

Furthermore, in the present embodiment, each of the electric wire bundles 17U-17W is directly and continuously wound around the stator core 2 into a wave shape by means of a nozzle winding machine (not shown). As a result, each of the wave-shaped electric wire bundles 17U-17W includes a plurality of turn portions 20 and a plurality of in-slot portions 21. Each of the in-slot portions 21 is received in a corresponding one of the slots 7 of the stator core 2. Each of the turn portions 20 protrudes from a corresponding one of axial end faces of the stator core 2 to connect a corresponding adjacent pair of the in-slot portions 21. Consequently, the turn portions 20 are located outside of the slots 7 of the stator core 2 and alternately on opposite axial sides of the stator core 2 in the circumferential direction. Moreover, the turn portions 20 are alternately positioned with the in-slot portions 21 in the circumferential direction of the stator core 2.

For example, as shown in FIG. 2B, the electric wire bundle 17U forming the U-phase winding 11 has the in-slot portion 21Ua received in the Nth slot 7, the in-slot portion 21Ub received in the (N+3)th slot 7, and the turn portion 20Ua extending across the (N+1)th and (N+2)th slots 7 to connect the in-slot portions 21Ua and 21Ub.

In the present embodiment, the U-phase, V-phase and W-phase windings 11-13 of the stator coil 3 are wound in the same circumferential direction into the same wave shape. Moreover, the stator coil 3 is wound around the stator core 2 in such a distributed winding manner that the U-phase, V-phase and W-phase windings 11-13 are circumferentially offset from one another by one slot 7.

More specifically, the slots 7, in which the in-slot portions 21V of the electric wire bundle 17V are received, are respectively immediately adjacent to those in which the in-slot portions 21U of the electric wire bundle 17U are received; the slots 7, in which the in-slot portions 21W of the electric wire bundle 17W are received, are respectively immediately adjacent to those in which the in-slot portions 21V of the electric wire bundle 17V are received.

For example, as shown in FIG. 1, the electric wire bundle 17V has the in-slot portion 21Va received in the (N+1)th slot 7, the in-slot portion 21Vb received in the (N+4)th slot 7, and the turn portion 20Va extending across the (N+2)th and (N+3)th slots 7 to connect the in-slot portions 21Va and 21Vb. The (N+1)th and (N+4)th slots 7 are respectively immediately adjacent to the Nth and (N+3)th slots 7 in which the in-slot portions 21Ua and 21Ub of the electric wire bundle 17U are respectively received.

Similarly, the electric wire bundle 17W has the in-slot portion 21Wa received in the (N+2)th slot 7, the in-slot portion 21Wb received in the (N+5)th slot 7, and the turn portion 20Wa extending across the (N+3)th and (N+4)th slots 7 to connect the in-slot portions 21Wa and 21Wb. The (N+2)th and (N+5)th slots 7 are respectively immediately adjacent to the (N+1)th and (N+4)th slots 7 in which the in-slot portions 21Va and 21Vb of the electric wire bundle 17V are respectively received.

Next, the outstanding features of the motor 1 according to the present embodiment will be described by taking the electric wire bundle 17U as an example.

As shown in FIG. 2B, in the present embodiment, the electric wire bundle 17U has a stranded structure at the turn portions 20U thereof which protrude from the corresponding axial end faces of the stator core 20. More specifically, at the turn portions 20U, the electric wires 16 of the electric wire bundle 17U are stranded (or twisted) together around the longitudinal axis of the electric wire bundle 17U.

On the other hand, at the in-slot portions 21U of the electric wire bundle 17U, the electric wires 16 are not stranded together, but extend substantially in parallel with each other. In other words, the electric wire bundle 17U does not have a stranded structure at the in-slot portions 21U thereof; the electric wires 16 of the electric wire bundle 17U are received in the corresponding slots 7 of the stator core 2 so as to extend substantially in parallel with each other.

Moreover, for each circumferentially-adjacent pair of the turn portions 20U, which are respectively positioned on opposite axial sides of the stator core 2 and connected to each other via a corresponding one of the in-slot portions 21U, the stranding direction of the electric wires 16 at one of the pair of the turn portions 20U is opposite to that at the other turn portion 20U.

For example, for the circumferentially-adjacent pair of the turn portions 20Ua and 20Ub, which are respectively on opposite axial sides (i.e., the upper and lower sides in FIG. 2B) of the stator core 2 and connected to each other via the in-slot portion 21Ub, the stranding direction of the electric wires 16 at the turn portion 20Ua is opposite to that at the turn portion 20Ub. Further, for the next circumferentially-adjacent pair of the turn portions 20Ub and 20Uc, the stranding direction of the electric wires 16 at the turn portion 20Ub is opposite to that at the turn portion 20Uc.

In the present embodiment, the electric wire bundle 17U is directly and continuously wound, using the nozzle winding machine, around the stator core 2 in the following manner.

First, the electric wires 16 of the electric wire bundle 17U, which extend parallel to each other, are inserted into the Nth slot 7 to form the in-slot portion 21Ua. Then, the electric wires 16 are stranded on one axial side (i.e., the upper side in FIG. 2B) of the stator core 2 by rotating a nozzle of the nozzle winding machine around the longitudinal axis of the electric wire bundle 17U in a first direction, and made to circumferentially extend across the (N+1)th and (N+2)th slots 7 to form the turn portion 20Ua. Next, the electric wires 16 are returned to their unstranded state by rotating the nozzle in a second direction that is opposite to the first direction, and inserted into the (N+3)th slot 7 to form the in-slot portion 21Ub. Thereafter, the electric wires 16 are stranded on the other axial side (i.e., the lower side) of the stator core 2 by rotating the nozzle around the longitudinal axis of the electric wire bundle 17U in the second direction, and made to circumferentially extend across the (N+4)th and (N+5)th slots 7 to form the turn portion 20Ub. Further, by repeating the above processes, the electric wire bundle 17U is wave-wound around the stator core 2 while sequentially forming the remaining in-slot portions 21U and turn-portions 20U along the circumferential direction of the stator core 2.

In addition, the electric wire bundles 17V and 17W are also wave-wound around the stator core 2 in the same manner as the electric wire bundle 17U.

Figure 3:
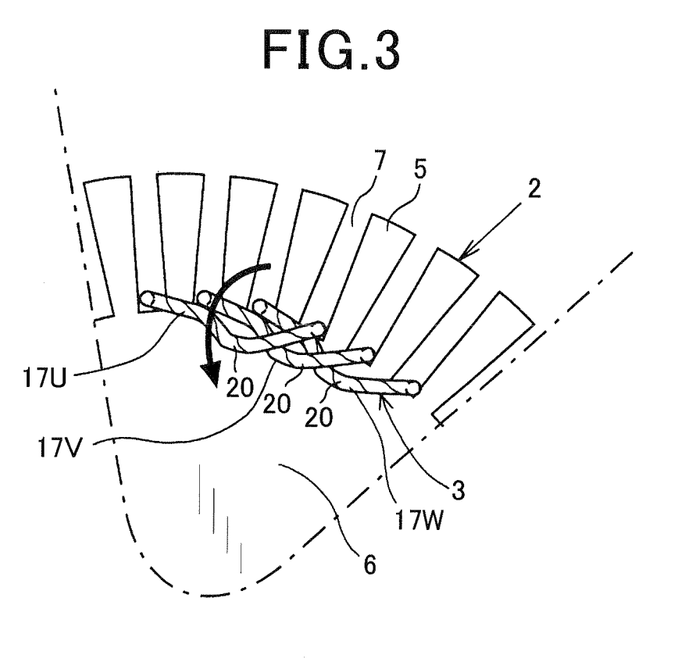
FIG. 3 is a schematic view illustrating the deflection of the electric wire bundle at a turn portion thereof.

Furthermore, in the present embodiment, as shown in FIG. 3, each of the electric wire bundles 17U-17W is deflected radially inward at the turn portions 20 thereof.

More specifically, for each of the electric wire bundles 17U-17W, when the electric wire bundle is made to circumferential extend to form the turn portions 20 during the winding process thereof, the electric wire bundle is forced and thereby deflected radially inward as indicated by the arrow in FIG. 3. Consequently, after the winding process, the electric wire bundle still remains deflected radially inward.

In addition, in the present embodiment, the motor 1 is of an outer rotor type and thus the slots 7 of the stator core 2 open radially outward on the radially-outer circumferential surface of the stator core 2. Therefore, the radially inward direction, in which the electric wire bundles 17U-17W are deflected, represents a radial direction away from the radially-outer circumferential surface of the stator core 2 on which the slots 7 open.

Moreover, in the present embodiment, each of the electric wire bundles 17U-17W is wave-wound around the stator core 2 by a plurality of turns. Moreover, for each consecutive pair of the turns, the electric wire bundle is wave-wound around the stator core 2 clockwise in one of the pair of the turns and counterclockwise in the other turn.

For example, as shown in FIG. 4, in the first turn, the electric wire bundle 17U is wound from the Nth slot 7 clockwise. That is, the winding start position of the electric wire bundle 17U is the Nth slot 7. Then, after completing the first turn and returning to the winding start position, in the second turn, the electric wire bundle 17U is wound from the winding start position counterclockwise. Further, though not shown in FIG. 4, after completing the second turn and returning to the winding start position, in the third turn, the electric wire bundle 17U is wound from the winding start position clockwise.

That is, for the consecutive pair of the first and second turns, the electric wire bundle 17U is wave-wound around the stator core 2 clockwise in the first turn and counterclockwise in the second turn. Moreover, for the consecutive pair of the second and third turns, the electric wire bundle 17U is wave-wound around the stator core 2 counterclockwise in the second turn and clockwise in the third turn.

In addition, the electric wire bundles 17V and 17W are also wave-wound around the stator core 2 in the same manner as the electric wire bundle 17U. However, while the winding start position of the electric wire bundle 17U is the Nth slot 7, those of the electric wire bundles 17V and 17W are respectively the (N+1)th and (N+2)th slots 7.

Figure 5:
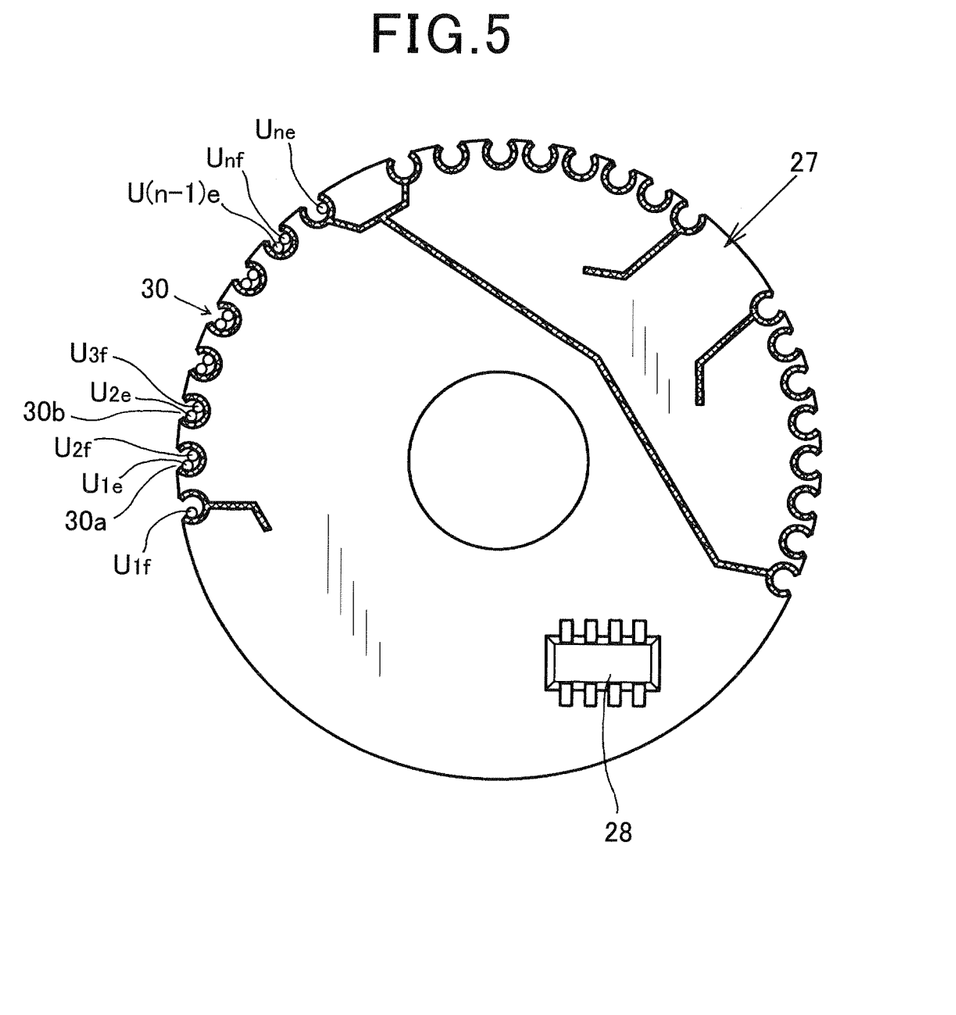
FIG. 5 is a front view of a printed circuit board provided in the electric rotating machine.

Referring now to FIG. 5, in the present embodiment, the electrical connection between the electric wires 16 forming the phase windings 11-13 of the stator coil 3 is made via a printed circuit board 27 provided in the motor 1.

Specifically, the printed circuit board 27 has a substantially circular discoid shape and is disposed on one axial side of the stator core 2. The printed circuit board 27 also has a semiconductor module 28 mounted thereon. The semiconductor module 28 has formed therein an inverter circuit for controlling energization of the stator coil 3. On the radially outer periphery of the printed circuit board 27, there are formed a plurality of ports 30. Each of the ports 30 has a copper pattern printed on the interior surface thereof; via the copper pattern, a corresponding pair of the electric wires 16 are electrically connected to each other.

For example, the winding-finish side end U1e of the electric wire U1 is electrically connected to the winding-start side end U2f of the electric wire U2 via the copper pattern formed in the port 30a. More specifically, the insulating coats are first removed from the ends U1e and U2f of the electric wires U1 and U2. Then, both the ends U1e and U2f are disposed within the port 30a so as to abut the copper pattern formed in the port 30a. Thereafter, both the ends U1e and U2f are soldered to the copper pattern, thereby being electrically connected to each other via the copper pattern. In like manner, the winding-finish side end U2e of the electric wire U2 is electrically connected to the winding-start side end U3f of the electric wire U3 via the copper pattern formed in the port 30b.

Moreover, the winding-start side end U1f of the electric wire U1 is electrically connected to the inverter circuit of the semiconductor module 28 via a copper pattern which is printed on the front surface of the printed circuit board 27 and only partially shown in FIG. 4.

The electric wires 16 forming the V-phase and W-phase windings 12 and 13 of the stator coil 3 are also electrically connected in the same manner as the electric wires 16 (i.e., U1-Un) forming the U-phase winding 11.

Furthermore, the winding-finish side end Une of the electric wire Un is electrically connected to both the winding-finish side end Vne of the electric wire Vn (not shown) and the winding-finish side end Wne of the electric wire Wn (not shown) via copper patterns printed on the front surface of the printed circuit board 27. Consequently, the U-phase, V-phase and W-phase windings 11, 12 and 13 of the stator coil 3 are star-connected.

The above-described three-phase AC motor 1 according to the present embodiment has the following advantages.

In the present embodiment, the motor 1 includes the cylindrical stator core (i.e., armature core) 2 and the three-phase stator coil (i.e., armature coil) 3. The stator core 2 has the slots 7 that are spaced from one another in the circumferential direction of the stator core 2 and each open on the radially-outer circumferential surface of the stator core 2. The stator coil 3 includes the U-phase, V-phase and W-phase windings 11-13 that are respectively formed of the electric wire bundles 17U-17W and each wound around the stator core 2 in the distributed winding manner. Each of the electric wire bundles 17U-17W includes the insulation-coated electric wires 16 that are electrically connected to one another. Moreover, each of the electric wire bundles 17U-17W has the in-slot portions 21 and the turn portions 20. Each of the in-slot portions 21 is received in a corresponding one of the slots 7 of the stator core 3. Each of the turn portions 20 protrudes from a corresponding one of the axial end faces of the stator core 2 and extends to connect a corresponding adjacent pair of the in-slot portions 21 of the electric wire bundle. Furthermore, for each of the electric wire bundles 17U-17W, the electric wires 16 of the electric wire bundle are stranded at the turn portions 20 of the electric wire bundle.

With the above configuration, since the electric wires 16 are stranded at the turn portions 20 of the electric wire bundles 17U-17W, tension will be applied to the electric wires 16. With the applied tension, it is possible to prevent each of the electric wires 16 forming the electric wire bundles 17U-17W from becoming slack; it is also possible to prevent each of the electric wire bundles 17U-17W from becoming slack. Consequently, it is possible to minimize both the difference in length between the electric wires 16 in the respective electric wire bundles 17U-17W and the difference in length between electric wire bundles 17U-17W (or between the U-phase, V-phase and W-phase windings 11-13). As a result, it is possible to achieve an even impedance distribution and thus an even electric current distribution in the stator coil 3.

Figure 6A:
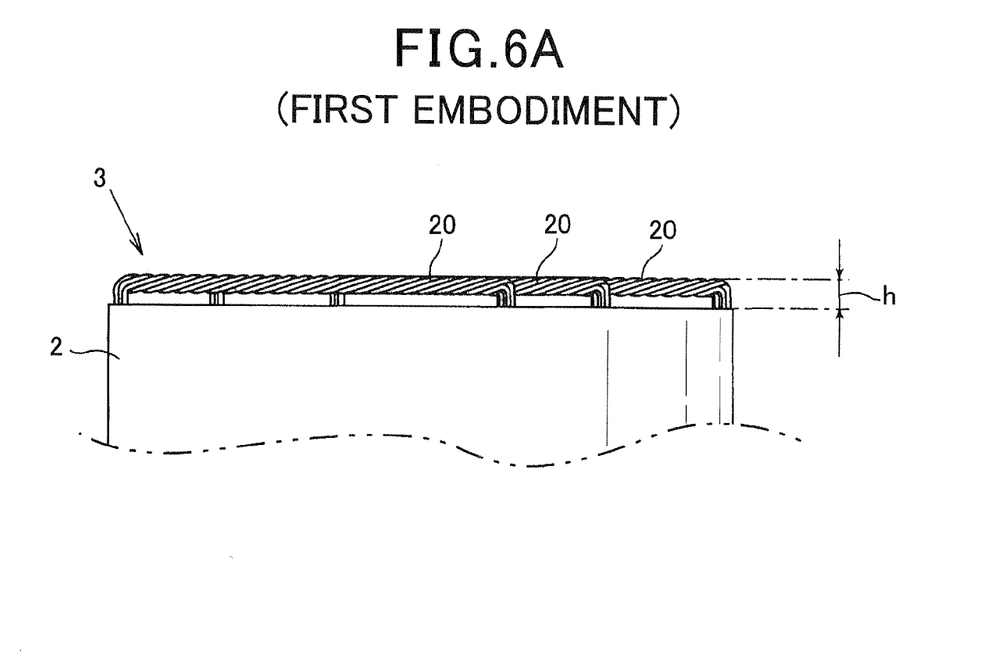
FIG. 6A is a schematic view illustrating the axial length of coil ends of the armature coil according to the first embodiment.
Figure 6B:
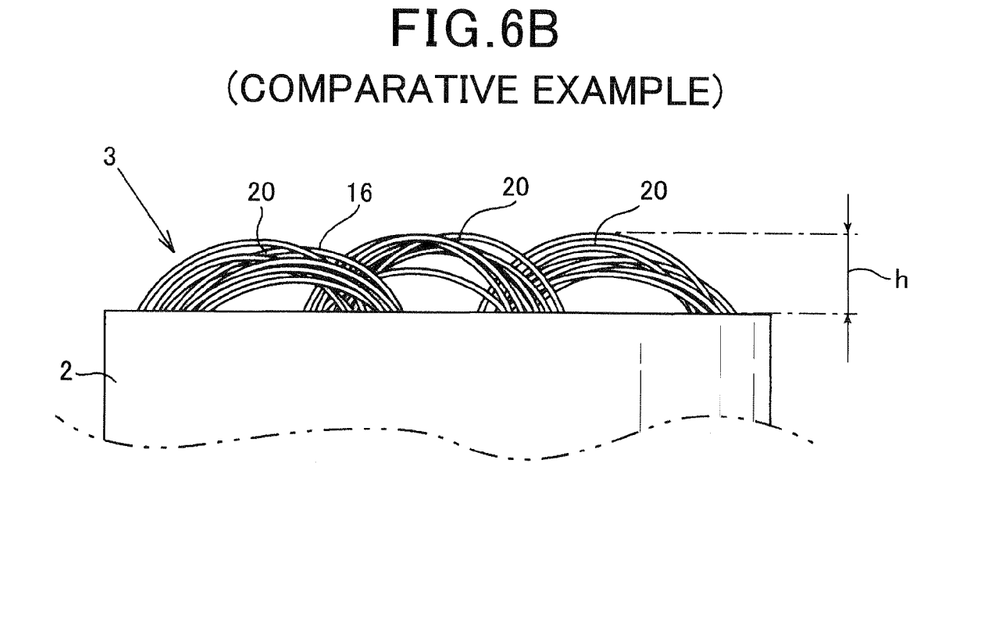
FIG. 6B is a schematic view illustrating the axial length of coil ends of an armature coil according to a comparative example.

Moreover, with the electric wires 16 stranded at the turn portions 20 of the electric wire bundles 17U-17W, it is possible to reliably prevent the electric wires 16 of the same electric wire bundle from being separated from each other on the axial end faces of the stator core 2. As a result, as shown in FIG. 6A, it is possible to minimize the axial length h of the coil ends of the stator coil 3. In comparison, as shown in FIG. 6B, in the case of the electric wires 16 being irregularly wound and not stranded at the turn portions 20, the axial length h of the coil ends of the stator coil 3 is considerably greater than that according to the present embodiment.

In the present embodiment, for each of the electric wire bundles 17U-17W, the electric wires 16 of the electric wire bundle extend substantially parallel to each other at the in-slot portions 21 of the electric wire bundle without being stranded together.

Consequently, it is possible to secure high space factors of the in-slot portions 21 of the electric wire bundles 17U-17W in the corresponding slots 7 of the stator core 2.

In the present embodiment, each of the electric wire bundles 17U-17W is wave-wound around the stator core 2 so that each circumferential-adjacent pair of the turn portions 20 of the electric wire bundle are respectively positioned on opposite axial sides of the stator core 2 and connected to each other via a corresponding one of the in-slot portions 21 of the electric wire bundle. Moreover, for each circumferential-adjacent pair of the turn portions 20 of the electric wire bundle, the electric wires 16 of the electric wire bundle are stranded in the first direction at one of the pair of the turn portions 20 and in the second direction at the other turn portion 20; the first direction is opposite to the second direction. That is, the stranding direction of the electric wires 16 alternates between the first and second directions in the circumferential direction of the stator core 2.

In winding the stator coil 3 directly and continuously around the stator core 2 using the nozzle winding machine, the electric wires 16 are stranded by rotating the nozzle of the nozzle winding machine around the longitudinal axis of the electric wire bundle. Therefore, if the electric wires 16 were stranded in the same direction at all the turn portions 20 of the electric wire bundle, they would be also stranded in front of the nozzle. Consequently, an additional step of restoring (or stranding back) the electric wires 16 in front of the nozzle would be needed.

However, in the present embodiment, by alternating the stranding direction of the electric wires 16 between the first and second directions in the circumferential direction of the stator core 2, the electric wires 16 will be automatically restored in front of the nozzle without an additional restoring step. As a result, it is possible to improve the productivity.

In the present embodiment, each of the electric wire bundles 17U-17W is deflected at the turn portions 20 thereof in the radially inward direction, in other words, in the radial direction away from the radially-outer circumferential surface of the stator core 2 on which the slots 7 of the stator core 2 open.

Consequently, each of the electric wire bundles 17U-17W is tensioned radially inward, thereby eliminating slack thereof. As a result, it is possible to prevent an uneven impedance distribution in the stator coil 3 due to slack of the electric wire bundles 17U-17W. In addition, it is also possible to prevent the stator coil 3 from becoming unwound due to springback of the electric wires 16.

In the present embodiment, each of the electric wire bundles 17U-17W is wave-wound around the stator core 2 by the plurality of turns. Moreover, for each consecutive pair of the turns, the electric wire bundle is wave-wound around the stator core 2 clockwise in one of the pair of the turns and counterclockwise in the other turn.

In wave-winding each of the electric wire bundles 17U-17W directly and continuously around the stator core 2 using the nozzle winding machine, if the electric wire bundle is wound in the same one of the clockwise and counterclockwise directions in all the plurality of turns, in other words, if the electric wire bundle is wound into a spiral shape, the electric wire bundle would be strained in front of the nozzle of the nozzle winding machine, thereby causing work hardening to occur in the electric wire bundle and thus making it difficult for the electric wire bundle to be wound around the stator core 2.

However, in the present embodiment, by alternating the winding direction of each of the electric wire bundles 17U-17W between the clockwise and counterclockwise directions for the plurality of turns, it is possible to prevent the electric wire bundle from being strained in front of the nozzle. In addition, tension will be applied to the electric wire bundle when the winding direction is alternated, thereby eliminating slack of the electric wire bundle.

In the present embodiment, the AC motor 1 further includes the printed circuit board 27 on which is mounted the inverter circuit for controlling energization of the stator coil 3. The printed circuit board 27 further has the copper patterns formed thereon. Each corresponding pair of the ends of the electric wires 16 of the electric wire bundles 17U-17W are electrically connected to each other via the corresponding one of the copper patterns.

With the above configuration, it is possible to easily make the electrical connection between the electric wires 16, thereby improving the productivity.

Second Embodiment

In this embodiment, for each of the electric wire bundles 17U-17W, the electric wires 16 of the electric wire bundle are divided into two groups.

Figure 7:
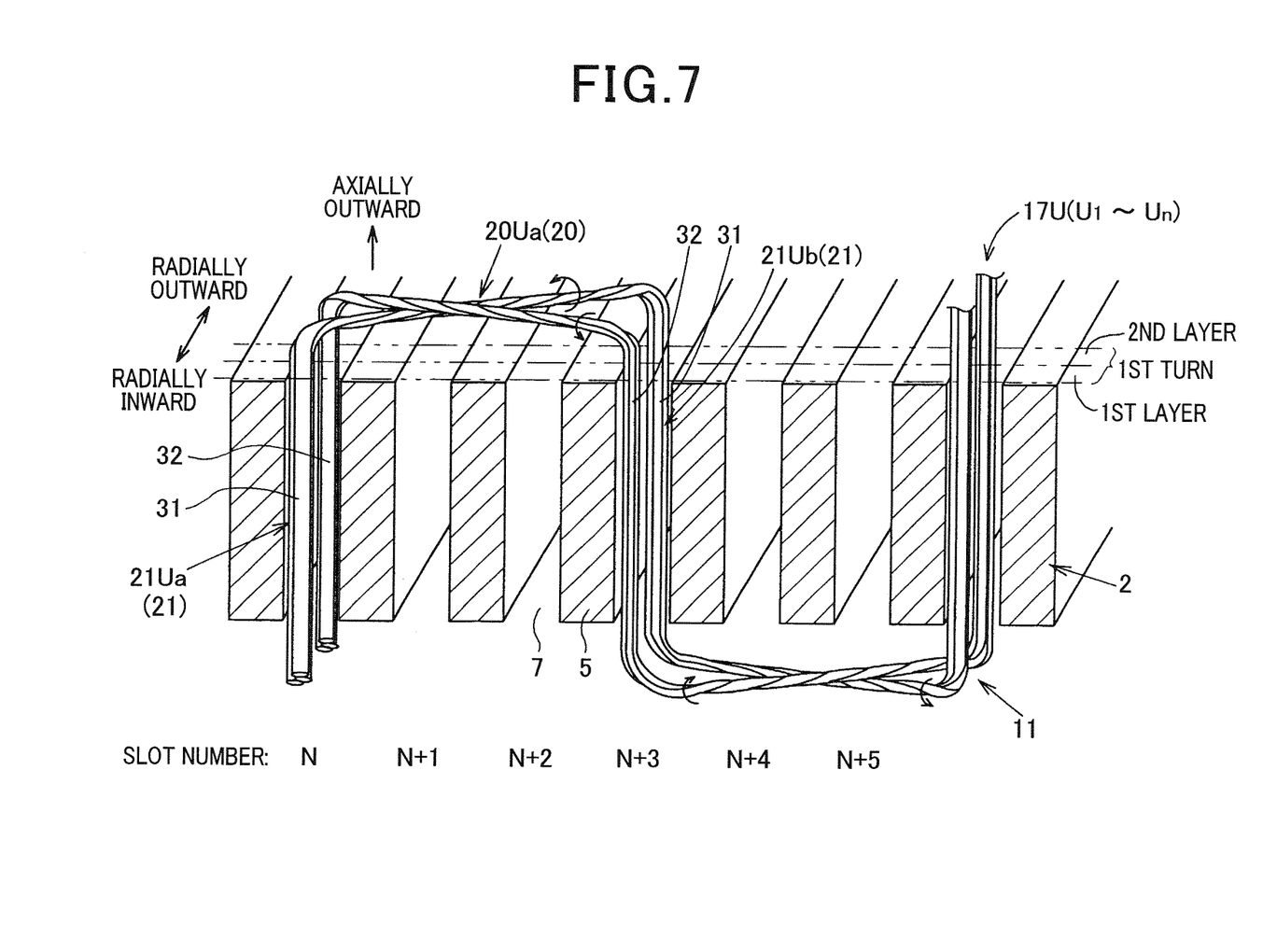
FIG. 7 is a schematic perspective view illustrating the manner, according to a second embodiment, of winding the electric wire bundle that makes up the U-phase winding around the armature core.

For example, referring to FIG. 7, for the electric wire bundle 17U that makes up the U-phase winding 11, the electric wires U1-Un of the bundle 17U are divided into a first group 31 and a second group 32. The first group 31 consists of the electric wires U1-Um that are electrically connected in series with one another, where m is an integer greater than 1 and less than n. On the other hand, the second group 32 consists of the electric wires Um-Un that are electrically connected in series with one another.

Moreover, in the present embodiment, the electric wires U1-Un of the electric wire bundle 17U are stranded at the turn portions 20U on a group basis. More specifically, the electric wires U1-Um of the first group 31 are stranded together at the turn portions 20U. Similarly, the electric wires Um-Un of the second group 32 are also stranded together at the turn portions 20U.

Further, for each circumferential-adjacent pair of the turn portions 20U of the electric wire bundle 17U, the electric wires U1-Um of the first group 31 are stranded in a first direction at one of the pair of the turn portions 20U and in a second direction at the other turn portion 20U, the first direction being opposite to the second direction. Similarly, for each circumferential-adjacent pair of the turn portions 20U, the electric wires Um-Un of the second group 32 are stranded in the first direction at one of the pair of the turn portions 20U and in the second direction at the other turn portion 20U.

In addition, at each of the turn portions 20U of the electric wire bundle 17U, the electric wires U1-Um of the first group 31 are stranded (or twisted) in one of the first and second directions, while the electric wires Um-Un of the second group 32 are stranded in the other direction. In other words, at each of the turn portions 20U, the stranding direction of the electric wires U1-Um of the first group 31 are opposite to that of the electric wires Um-Un of the second group 32.

Furthermore, for each turn of the electric wire bundle 17U, the first and second groups 31 and 32 are radially arranged in two layers in each of the in-slot portions 21U of the electric wire bundle 17U; the two layers are a first layer and a second layer that is positioned radially outside of the first layer. Moreover, the first and second groups 31 and 32 cross each other at each of the turn portions 20U so that for each circumferentially-adjacent pair of the in-slot portions 21U, the first and second groups 31 and 32 are positioned respectively at the first and second layers in one of the pair of the in-slot portions 21U and respectively at the second and first layers in the other in-slot portion 21U.

For example, as shown in FIG. 7, in the in-slot portion 21Ua that is in the first turn of the electric wire bundle 17U and located in the Nth slot 7, the firs group 31 is positioned in the first layer while the second group 32 is positioned in the second layer. In comparison, in the in-slot portion 21Ub that is also in the first turn of the electric wire bundle 17U but located in the (N+3)th slot 7, the firs group 31 is positioned in the second layer while the second group 32 is positioned in the first layer. In addition, the in-slot portions 21Ua and 21Ub are circumferentially adjacent to each other and connected by the turn portion 21Ua that extends across the (N+1)th and (N+2)th slots 7; the first and second groups 31 and 32 cross each other at the turn portion 21U.

Further, at each of the turn portions 20U, one of the first and second groups 31 and 32 which extends from the second layer in one of a circumferentially-adjacent pair of the in-slot portions 21U to the first layer in the other in-slot portion 21U is wound on (i.e., positioned axially outside of) the other group which extends from the first layer in the one in-slot portion 21U to the second layer in the other in-slot portion 21U.

For example, as shown in FIG. 7, at the turn portion 20Ua that extends across the (N+1)th and (N+2)th slots 7, the second group 32 which extends from the second layer in the in-slot portion 21Ua received in the Nth slot 7 to the first layer in the in-slot portion 21Ub received in the (N+3)th slot 7 is positioned axially outside of the first group 31 which extends from the first layer in the in-slot portion 21Ua to the second layer in the in-slot portion 21Ub.

With the above arrangement, during the formation of the turn portion 20Ua in the winding process, the second group 32 will be forced radially inward, thereby applying tension also to the first group 31 radially inward. Consequently, it is possible to deflect the turn portion 20U radially inward.

In addition, though only the manner of winding the electric wire bundle 17U according to the present embodiment is explained in detail above, it should be noted that the electric wire bundles 17V and 17W are also wound in the same manner as the electric wire bundle 17U.

According to the present embodiment, it is possible to further achieve the following advantages.

In the present embodiment, for each of the electric wire bundles 17U-17W that respectively make up the U-phase, V-phase and W-phase windings 11-13, the electric wires 16 of the electric wire bundle are divided into the first and second groups and stranded on a group basis.

Since the number of the electric wires 16 in each individual group is less than the total number of the electric wires 16 in the electric wire bundle, it is possible to facilitate the process of stranding the electric wires 16.

Further, in the present embodiment, for each of the electric wire bundles 17U-17W, the first and second groups are radially arranged in two layers in each of the in-slot portions 21 of the electric wire bundle. Moreover, the first and second groups cross each other at each of the turn portions 20U of the electric wire bundle so that for each circumferentially-adjacent pair of the in-slot portions 21, the first and second groups are positioned respectively at the first and second layers in one of the pair of the in-slot portions 21 and respectively at the second and first layers in the other in-slot portion 21.

With the above arrangement, it is possible to minimize the difference in length between the electric wires 16 of the first group and the electric wires 16 of the second group, thereby minimizing the difference in electrical resistance therebetween. Moreover, it is also possible to minimize the difference in degree of being influenced by magnetic flux created in the motor 1 between the electric wires 16 of the first group and the electric wires 16 of the second group, thereby minimizing the difference in reactance therebetween. As a result, it is possible to minimize the difference in impedance between the electric wires 16 of the first group and the electric wires 16 of the second group, thereby preventing an uneven impedance distribution in the stator coil 3.

Third Embodiment

In the first embodiment, in each of the slots 7 of the stator core 2, all the electric wires 16 of a corresponding one of the electric wire bundles 17U-17W extend substantially parallel to each other without being stranded together.

In comparison, in the present embodiment, in each of the slots 7 of the stator core 2, part of the electric wires 16 of a corresponding one of the electric wire bundles 17U-17W are stranded together while the remaining electric wires 16 of the corresponding electric wire bundle extend substantially parallel to each other; the stranded electric wires 16 are positioned closer to the opening of the slot 7 (or to the radially-outer circumferential surface of the stator core 2) than the unstranded electric wires 16 are.

Figure 8:
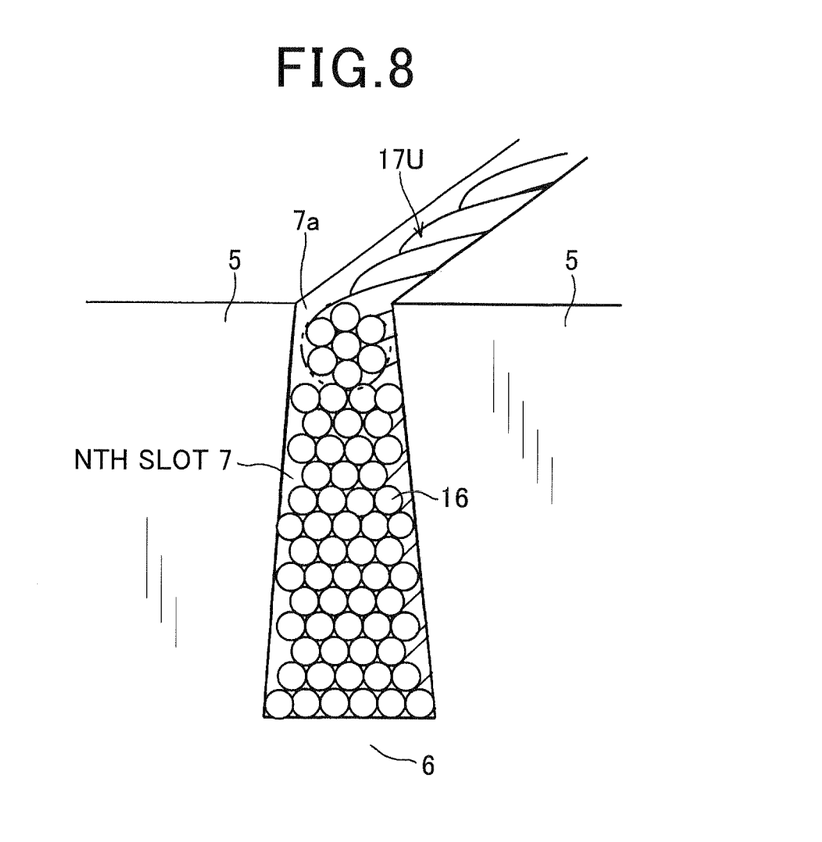
FIG. 8 is a schematic perspective view illustrating the manner, according to a third embodiment, of stranding electric wires of the electric wire bundle in a corresponding slot of the armature core.

For example, as shown in FIG. 8, in the Nth slot 7, part of the electric wires 16 of the electric wire bundle 17U are stranded while the remaining electric wires 16 of the electric wire bundle 17U extend substantially parallel to each other without being stranded; the stranded electric wires 16 are positioned closer to the opening 7a of the slot 7 than the unstranded electric wires 16 are.

Moreover, for each of the slots 7 of the stator core 2, the circumferential width of the slot 7 is greater at the opening 7a than at the bottom. Therefore, it is possible to close the opening 7a of the slot 7 with the stranded electric wires 16 of the corresponding electric wire bundle, thereby preventing the unstranded electric wires 16 from moving out of the slot 7 via the opening 7a. In addition, since only part of the electric wires 16 of the corresponding electric wire bundle are stranded, it is still possible to secure a relatively high space factor of the corresponding electric wire bundle in the slot 7.

While the above particular embodiments have been shown and described, it will be understood by those skilled in the art that various modifications, changes, and improvements may be made without departing from the spirit of the invention.

For example, in the previous embodiments, the present invention is directed to the three-phase AC motor 1. However, the invention can also be applied to other electric rotating machines, such as a three-phase AC generator.

In the previous embodiments, the stator of the motor 1 functions as the armature of the motor 1. However, the invention can also be applied to an electric rotating machine in which a rotor functions as the armature of the machine.

In the previous embodiments, the motor 1 is of an outer rotor type so that the slots 7 of the stator core 2 open on the radially-outer circumferential surface of the stator core 2. However, the invention can also be applied to an inner rotor-type motor in which the slots of the stator core open on the radially-inner circumferential surface of the stator core.

In the first embodiment, for each of the electric wire bundles 17U-17W, all the electric wires 16 of the electric wire bundle extend substantially parallel to each other at the in-slot portions 21 of the electric wire bundle without being stranded together. However, all the electric wires 16 of the electric wire bundle may also be stranded together at the in-slot portions 21 thereof.

In the first embodiment, for each of the electric wire bundles 17U-17W, the electric wires 16 of the electric wire bundle are electrically connected in series with one another. However, the electric wires 16 of the electric wire bundle may also be electrically connected in parallel with each other. Moreover, it is also possible to: divide the electric wires 16 of the electric wire bundle into two groups; electrically connect the electric wires in series with the one another in each of the groups; and electrically connect the two groups in parallel with each other.

In the second embodiment, for each of the electric wire bundles 17U-17W, the electric wires 16 of the electric wire bundle are divided into two groups. However, the electric wires 16 of the electric wire bundle may also be divided into three or more groups.

What is claimed is:

1. An electric rotating machine comprising:
a cylindrical armature core having a plurality of slots that are spaced from one another in a circumferential direction of the armature core and each open on a circumferential surface of the armature core; and
a multi-phase armature coil including a plurality of phase windings and being wound around the armature core in a distributed winding manner,
wherein
each of the phase windings of the armature coil is formed of an electric wire bundle which includes a plurality of insulation-coated electric wires that are electrically connected to one another,
each of the electric wire bundles forming the phase windings of the armature coil has a plurality of in-slot portions and a plurality of turn portions, each of the in-slot portions being received in a corresponding one of the slots of the armature core, each of the turn portions protruding from a corresponding one of axial end faces of the armature core and extending to connect a corresponding adjacent pair of the in-slot portions of the electric wire bundle, and
for each of the electric wire bundles, the electric wires of the electric wire bundle are stranded at least at the turn portions of the electric wire bundle.

2. The electric rotating machine as set forth in claim 1, wherein for each of the electric wire bundles, the electric wires of the electric wire bundle extend substantially parallel to each other at the in-slot portions of the electric wire bundle without being stranded together.

3. The electric rotating machine as set forth in claim 1, wherein each of the electric wire bundles is wave-wound around the armature core so that each circumferential-adjacent pair of the turn portions of the electric wire bundle are respectively positioned on opposite axial sides of the armature core and connected to each other via a corresponding one of the in-slot portions of the electric wire bundle, and
for each circumferential-adjacent pair of the turn portions of the electric wire bundle, the electric wires of the electric wire bundle are stranded in a first direction at one of the pair of the turn portions and in a second direction at the other turn portion, the first direction being opposite to the second direction.

4. The electric rotating machine as set forth in claim 1, wherein for each of the electric wire bundles, the electric wires of the electric wire bundle are divided into a plurality of groups and stranded on a group basis.

5. The electric rotating machine as set forth in claim 4, wherein each of the electric wire bundles is wave-wound around the armature core so that each circumferential-adjacent pair of the turn portions of the electric wire bundle are respectively positioned on opposite axial sides of the armature core and connected to each other via a corresponding one of the in-slot portions of the electric wire bundle, and
for each circumferential-adjacent pair of the turn portions of the electric wire bundle, the electric wires of each of the groups are stranded in a first direction at one of the pair of the turn portions and in a second direction at the other turn portion, the first direction being opposite to the second direction.

6. The electric rotating machine as set forth in claim 4, wherein each of the electric wire bundles is wave-wound around the armature core so that each circumferential-adjacent pair of the turn portions of the electric wire bundle are respectively positioned on opposite axial sides of the armature core and connected to each other via a corresponding one of the in-slot portions of the electric wire bundle,
for each of the electric wire bundles, the electric wires of the electric wire bundle are divided into a first group and a second group,
the first and second groups are radially arranged in two layers in each of the in-slot portions of the electric wire bundle, the two layers comprising a first layer and a second layer that is positioned closer to the circumferential surface of the armature core, on which the slots of the armature core open, than the first layer is, and
the first and second groups cross each other at each of the turn portions of the electric wire bundle so that for each circumferentially-adjacent pair of the in-slot portions, the first and second groups are positioned respectively at the first and second layers in one of the pair of the in-slot portions and respectively at the second and first layers in the other in-slot portion.

7. The electric rotating machine as set forth in claim 1, wherein each of the electric wire bundles is deflected at the turn portions thereof in a radial direction away from the circumferential surface of the armature core on which the slots of the armature core open.

8. The electric rotating machine as set forth in claim 1, wherein each of the electric wire bundles is wave-wound around the armature core by a plurality of turns, and
for each consecutive pair of the turns, the electric wire bundle is wave-wound around the armature core clockwise in one of the pair of the turns and counterclockwise in the other turn.

9. The electric rotating machine as set forth in claim 1, further comprising a printed circuit board on which is mounted an inverter circuit for controlling energization of the armature coil,
wherein
the printed circuit board further has a plurality of copper patterns formed thereon, and
each corresponding pair of ends of the electric wires of the electric wire bundles are electrically connected to each other via a corresponding one of the copper patterns.

10. The electric rotating machine as set forth in claim 1, wherein in each of the slots of the armature core, part of the electric wires of a corresponding one of the electric wire bundles are stranded together while the remaining electric wires of the corresponding electric wire bundle extend substantially parallel to each other without being stranded together, the stranded electric wires being positioned closer to the circumferential surface of the armature core, on which the slots of the armature core open, than the unstranded electric wires are.

* * * * *